(12) United States Patent
Meschter et al.

(10) Patent No.: US 7,910,172 B2
(45) Date of Patent: Mar. 22, 2011

(54) METHOD FOR FABRICATING A COMPONENT HAVING AN ENVIRONMENTAL BARRIER COATING

(75) Inventors: Peter Joel Meschter, Niskayuna, NY (US); Curtis Alan Johnson, Niskayuna, NY (US); Krishan Lal Luthra, Niskayuna, NY (US); Reza Sarrafi-Nour, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 137 days.

(21) Appl. No.: 12/484,197

(22) Filed: Jun. 13, 2009

(65) Prior Publication Data
US 2009/0250153 A1 Oct. 8, 2009

Related U.S. Application Data

(62) Division of application No. 11/298,735, filed on Dec. 9, 2005, now Pat. No. 7,595,114.

(51) Int. Cl.
*B05D 7/00* (2006.01)

(52) U.S. Cl. ............... 427/419.1; 427/419.3; 427/419.7
(58) Field of Classification Search .................. None
See application file for complete search history.

(56) References Cited

U.S. PATENT DOCUMENTS

| | | | |
|---|---|---|---|
| 6,296,941 | B1 | 10/2001 | Eaton, Jr. et al. |
| 6,312,763 | B1 | 11/2001 | Eaton, Jr. et al. |
| 6,410,148 | B1 | 6/2002 | Eaton, Jr. et al. |
| 6,759,151 | B1 | 7/2004 | Lee |
| 7,115,327 | B2 | 10/2006 | Spitsberg et al. |
| 7,323,247 | B2 | 1/2008 | Raybould et al. |

*Primary Examiner* — Timothy M Speer
(74) *Attorney, Agent, or Firm* — Ann M. Agosti

(57) ABSTRACT

A method for fabricating a component having an environmental barrier coating. The method includes providing a component including silicon having a first coefficient of thermal expansion. A bondcoat is bonded to at least a portion of an outer surface of the component. An intermediate layer having a general composition of $RE_2Si_2O_7$ is bonded to the bondcoat. The intermediate layer has a second coefficient of thermal expansion matched to the first coefficient of thermal expansion. A protective layer having a general composition of $RE_2SiO_5$ is bonded to the intermediate layer. A surface layer is bonded to the protective layer. The surface layer includes RE and has a ratio of RE to oxygen of at least 2:3.

5 Claims, 1 Drawing Sheet

METHOD FOR FABRICATING A COMPONENT HAVING AN ENVIRONMENTAL BARRIER COATING

CROSS-REFERENCE TO RELATED APPLICATION

This application is a divisional application of U.S. patent application Ser. No. 11/298,735 filed on Dec. 9, 2005 now U.S. Pat. No. 7,595,114, which is hereby incorporated by reference in its entirety.

BACKGROUND OF THE INVENTION

This invention relates generally to environmental barrier coatings and, more particularly, to environmental barrier coatings for a component fabricated from a silicon-based substrate material.

Rare earth (RE) disilicate environmental barrier coatings (EBCs), having a general composition of $RE_2Si_2O_7$, protect gas turbine components fabricated from a silicon-containing ceramic matrix composite (CMC) substrate material or silicon nitride ($Si_3N_4$) substrate material from harmful exposure to chemical environments in-service. RE=La, Ce, Pr, Nd, Sm, Eu, Gd, Tb, Dy, Ho, Er, Tm, Yb, and Lu, and includes the rare earth-like elements Y and Sc. The rare earth disilicates have coefficients of thermal expansion (CTEs) that are well matched to the CTE of the CMC substrate material. Such disilicates have a minimal tendency to crack in service and during thermal cycling of the component. However, disilicates are vulnerable to leaching of $SiO_2$ and recession by chemical interactions with water vapor in the turbine combustion atmosphere. Such leaching creates a microporous microstructure in the EBC, and an initially dense EBC is converted to a porous layer in less than the required design lifetime. Thus, such disilicates do not have the durability required for the application.

Rare earth (RE) monosilicates, having a general composition of $RE_2SiO_5$, have been used as EBCs instead of rare earth disilicates. RE monosilicates have low rates of volatilization in combustion atmospheres containing water vapor and, hence, have low recession rates. However, the monosilicates typically have CTEs that are not well matched to the CTE of the CMC substrate material. As a result, the monosilicate topcoats tend to crack during application, heat treatment and/or service exposure, allowing water vapor to penetrate the topcoat and cause subsurface chemical reactions and/or premature EBC spallation. The extent of such cracking is directly dependent on the thickness of the coating layer and the difference in CTE between the coating layer and the substrate material.

Many conventional EBC materials are deposited on components using a plasma spraying process. The plasma spraying process provides flexibility to deposit a large variety of materials within a wide coating thickness range (ranging from about 0.002 inch to about 0.040 inch) without major process modifications. However, the deposited coating material is often inherently in a thermodynamically metastable state (such as an amorphous phase, a higher temperature phase or one or more non-equilibrium phases) due to rapid quenching during the spray process. Upon exposure to high temperature and transformation to the equilibrium state, the constrained coating can undergo a variety of dimensional changes resulting in stresses in the coating that can lead to various types of cracking behavior. The propensity of the coating to crack tends to be directly proportional to the coating thickness.

For a $RE_2SiO_5$ coating processed by plasma spraying, this is found to be particularly problematic, leading to both catastrophic through-thickness cracking and delamination of the coating upon exposure to elevated temperatures. In this case, the through-thickness cracking of the coating material is believed to be mainly driven by the mismatch between the CTE of the coating material, about $6 \times 10^{-6}$ 1/C to about $7 \times 10^{-6}$ 1/C, and the CTE of the substrate material, about $4.5 \times 10^{-6}$ 1/C to about $5.0 \times 10^{-6}$ 1/C for SiC or a SiC/SiC composite. The delamination of the coating is observed primarily around non-planar regions of the substrate material and/or geometrical discontinuities and surface perturbations. Further, the delamination has been attributed to dimensional changes during the first heating cycle to service temperature. The cracking behavior has been observed for coatings with a thickness of as low as about 0.002 inch. Additionally, the coatings processed by plasma spraying are prone to contain open porosity and/or a network of fine cracks intercepting the otherwise closed pores and voids. For EBC applications, open porosity in the coating can be detrimental. The open porosity provides a path for rapid water vapor penetration and, hence, accelerated localized degradation and/or deterioration of the underlying materials prone to water-vapor mediated oxidation and volatilization.

BRIEF DESCRIPTION OF THE INVENTION

In one aspect, the present invention provides an environmental barrier coating for a component including silicon, and having a first coefficient of thermal expansion. The environmental barrier coating includes a silicon bondcoat that is bonded to at least a portion of an outer surface of the component. At least one intermediate layer is bonded to the silicon bondcoat and has a second coefficient of thermal expansion matched to the first coefficient of thermal expansion. The at least one intermediate layer has a general composition of $RE_2Si_2O_7$. A protective layer is bonded to the intermediate layer and has a general composition of $RE_2SiO_5$. A surface layer is bonded to the protective layer. The surface layer includes RE and has a ratio of RE to oxygen of at least 2:3.

In another aspect, the present invention provides a component for a gas turbine engine. The component includes a substrate material including silicon and having a first coefficient of thermal expansion. A silicon bondcoat is bonded to at least a portion of an outer surface of the substrate material. At least one intermediate layer is bonded to the silicon bondcoat. The at least one intermediate layer has a second coefficient of thermal expansion matched to the first coefficient of thermal expansion and has a general composition of $RE_2Si_2O_7$. A protective layer is bonded to the at least one intermediate layer and has a general composition of $RE_2SiO_5$. A surface layer is bonded to the protective layer and includes RE. The surface layer has a ratio of RE to oxygen of at least 2:3.

In another aspect, the present invention provides a method for fabricating a component having an environmental barrier coating. The method includes providing the component including silicon having a first coefficient of thermal expansion. A bondcoat is bonded to at least a portion of an outer surface of the component. An intermediate layer having a general composition of $RE_2Si_2O_7$ is bonded to the bondcoat. The intermediate layer has a second coefficient of thermal expansion matched to the first coefficient of thermal expansion. A protective layer having a general composition of $RE_2SiO_5$ is bonded to the intermediate layer. A surface layer is bonded to the protective layer. The surface layer includes RE and has a ratio of RE to oxygen of at least 2:3.

DETAILED DESCRIPTION OF THE INVENTION

Figure 1:
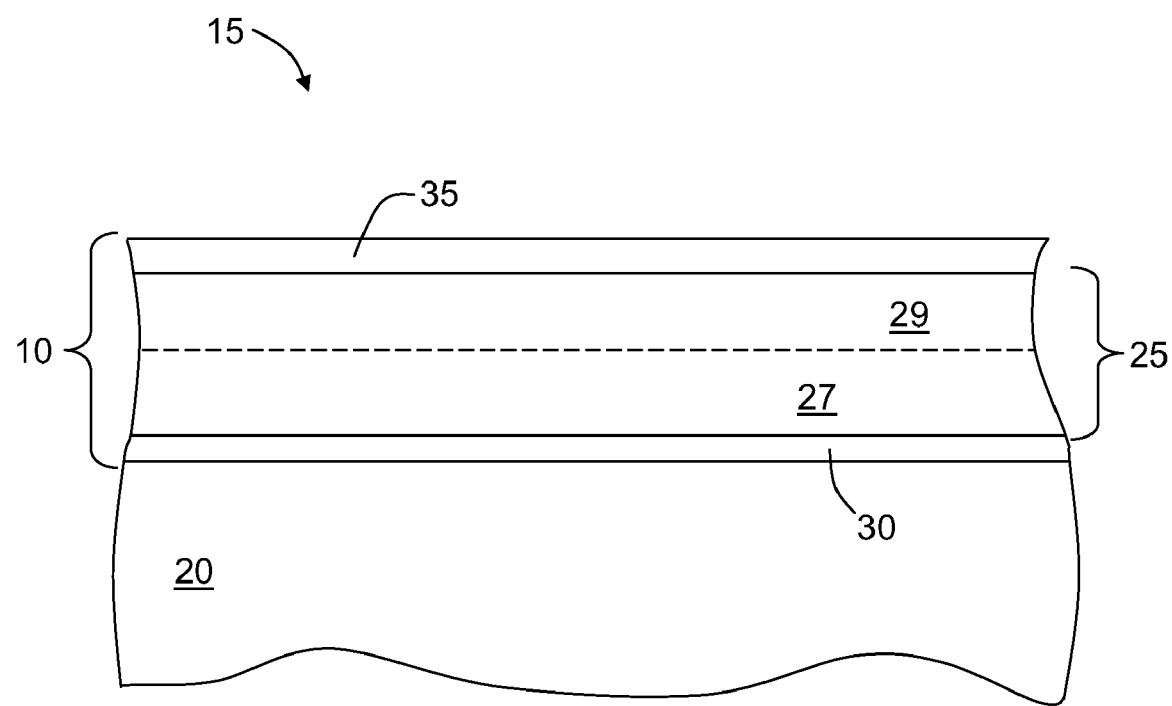
FIG. 1 is a partial sectional side view of a component coated with an environmental barrier coating, according to one embodiment of this invention.

Embodiments of the present invention provide an environmental barrier coating for a silicon-based material, including a ceramic matrix composite substrate material or a silicon nitride substrate material, for example. Further, the present invention provides a method for fabricating a component having an environmental barrier coating. In one embodiment, the environmental barrier coating includes a silicon bondcoat, an intermediate layer having a coefficient of thermal expansion matched to a coefficient of thermal expansion of the underlying substrate material, and a thin, uniform recession resistant surface layer that is crack-resistant during service and durable over the design life of the underlying component.

Embodiments of the present invention are described below in reference to its application in connection with a component for a gas turbine engine fabricated from a ceramic matrix composite substrate material, a silicon nitride substrate material, a silicon carbide substrate material and/or a metal silicide substrate material. However, it will be obvious to those skilled in the art and guided by the teachings herein provided that the invention is likewise applicable to any suitable component that is fabricated from a silicon-based substrate material. Further, such components are incorporated into systems including, without limitations, other turbine engines, wherein the components are subjected to extreme thermal and/or chemical conditions during system operations. During operation conditions, these components are subjected to combustion environments for up to about 32,000 hours at material surface temperatures that may exceed 2400° F.

In one embodiment, various components of the gas turbine engine are formed of a ceramic material or ceramic matrix composite (CMC) material. In a particular embodiment, the CMC material is a SiC/SiC CMC material. The SiC/SiC CMC material includes a silicon carbide composite material infiltrated with silicon and reinforced with coated silicon carbide fibers. In one embodiment, the ceramic material is a monolithic ceramic material, such as SiC.

Referring to FIG. 1, in one embodiment, an environmental barrier coating 10 is applied to a silicon-based material, such as a turbine engine component 15 fabricated from a CMC substrate material 20. Alternatively, turbine engine component 15 is fabricated from a silicon nitride ($Si_3N_4$) substrate material (not shown). It is apparent to those skilled in the art and guided by the teachings herein provided that turbine engine component 15 can be fabricated from any suitable silicon-based material.

Environmental barrier coating 10 includes at least one intermediate layer 25 bonded to or deposited on CMC substrate material 20 and bonded thereto. As used herein, references to the term "bonded" are to be understood to include direct and indirect bonding through another layer, such as a bondcoat or an intermediate layer. In one embodiment, intermediate layer 25 has a total thickness of about 3.0 mil to about 10.0 mil. Intermediate layer 25 has a coefficient of thermal expansion that is matched to the coefficient of thermal expansion of substrate material 20. As used herein, references to the term "matched," in reference to a coefficient of thermal expansion, are to be understood to refer to a first layer, such as intermediate layer 25, having a coefficient of thermal expansion within about +/−15% of a coefficient of thermal expansion of a second layer, such as substrate material 20. In one embodiment, intermediate layer 25 has a coefficient of thermal expansion similar to the coefficient of thermal expansion of CMC substrate material 20. In a particular embodiment, intermediate layer 25 has a coefficient of thermal expansion substantially equal to the coefficient of thermal expansion for CMC substrate material 20. As shown in FIG. 1, in one embodiment, environmental barrier coating 10 includes a silicon bondcoat 30 applied to or deposited on CMC substrate material 20 before intermediate layer 25 is applied to or deposited on CMC substrate material 20. In a particular embodiment, bondcoat 30 has a coefficient of thermal expansion matched to substrate material 20 and/or intermediate layer 25.

In one embodiment, intermediate layer 25 includes at least one layer formed from at least one rare earth (RE) silicate including, but not limited to, Y, Dy, Ho, Er, Tm, Tb, Yb and/or Lu, having a general composition of $RE_2Si_2O_7$. For example, a first intermediate layer 27 includes $RE_2Si_2O_7$. Additionally, intermediate layer 25 includes a second or outer intermediate layer 29 positioned between first intermediate layer 27 and an external barrier layer, such as a recession resistant surface layer 35, as shown in FIG. 1. Although only two intermediate layers 27, 29 are shown in FIG. 1, it is apparent to those skilled in the art and guided by the teachings herein provided that intermediate layer 25 can include any suitable number of layers. In one embodiment, the layers have a combined thickness of about 3.0 mil to about 10.0 mil. In addition to the at least one rare earth silicate, or alternatively, intermediate layer 25 may include at least one suitable material layer and/or each intermediate layer 27, 29 may include at least one suitable material.

Recession resistant surface layer 35 is applied to or deposited on intermediate layer 25. In one embodiment, recession resistant surface layer 35 is applied to or deposited on intermediate layer 25 using a physical vapor deposition or chemical vapor deposition process. Alternatively, recession resistant surface layer 35 is applied to intermediate layer 25 using infiltration by an aqueous solution of a salt of the desired compound, which is then decomposed to yield the desired oxide or metal in the micropores. Recession resistant surface layer 35 and/or the infiltrated layer can be applied using any suitable process known to those skilled in the art and guided by the teachings herein provided including, but not limited to, sol gel technology, plasma spray, slurry spray and/or paint spray processes.

In one embodiment, recession resistant surface layer 35 is applied uniformly to or deposited uniformly on outer intermediate layer 29. In this embodiment, recession resistant surface layer 35 has a thickness of about 0.5 mil to about 2.0 mil. Recession resistant surface layer 35 has a suitable thickness to prevent or resist cracking, penetration by water vapor and/or peeling in-service. In alternative embodiments the recession resistant surface layer 35 has a suitable thickness that prevents or resists cracking, water vapor penetration and/or peeling. For example, in one embodiment, recession resistant layer has a thickness less than about 0.001 inch (25 micrometers).

In one embodiment, recession resistant protective layer 36 includes at least one rare earth (RE) silicate including, but not limited to, Y, Dy, Ho, Er, Tm, Tb, Yb and/or Lu, having a general composition of $RE_2SiO_5$. Recession resistant protective layer 36 is chemically compatible with the underlying intermediate layer 25 and has a high recession resistance. For example, recession resistant protective layer 36 may include $Y_2SiO_5$ applied to or deposited on intermediate layer 25 containing a $Y_2Si_2O_7$ outer surface. Surface layer 38 is chemically compatible with the underlying protective layer 36 and has high recession resistance. Surface layer 38 may include $Y_2O_3$ applied to or deposited on protective layer 36. It is apparent to those skilled in the art and guided by the teachings herein provided that recession resistant protective layer 36 and recession resistance surface layer 38 can include any suitable material including one or more rare earth metals.

In one embodiment, recession resistant surface layer 35 includes a protective layer 36 bonded to intermediate layer 25. In this embodiment, protective layer 36 has a general composition of $RE_2SiO_5$. Recession resistant surface layer 35 further includes a surface layer 38 bonded to protective layer 36. Surface layer 38 includes at least one RE, namely, Y, Dy, Ho, Er, Tm, Tb, Yb and/or Lu, and has a ratio of RE to oxygen of at least 2:3. Surface layer 38 includes $RE_2O_3$, a RE metal, a salt comprising RE and/or an organometallic material including RE. Suitable organometallic material includes, without limitation, a suitable alcoxide including a metallic specie including a RE, such as, without limitation, RE-isopropoxide (RE-[OCH(CH$_3$)$_2$]$_3$), RE-tri-n-butoxide (RE-(OC$_4$H$_9$)$_3$), or RE-ethoxide (RE-(OC$_2$H$_5$)$_3$). In a particular embodiment, surface layer 38 has a general composition of $RE_2O_3$, or reacts with a gas phase to from the general composition of $RE_2O_3$.

In one embodiment, protective layer 36 is formed by a chemical reaction of surface layer 38 with intermediate layer 25. In a particular embodiment, an interface between bondcoat 30 and intermediate layer 25, and an interface between protective layer 36 and surface layer 38 is substantially continuous. Alternatively, protective layer 36 is deposited directly onto intermediate layer 25 and surface layer 38 is deposited directly onto protective layer 36, substantially without interlayer chemical reactions, to form a multilayer environmental barrier coating 10. In this embodiment, the interfaces between bondcoat 30 and intermediate layer 25, intermediate layer 25 and protective layer 36, and protective layer 36 and surface layer 38 may also be substantially continuous.

In one embodiment, intermediate layer 25 includes a microvoided surface region infiltrated with a recession resistant oxide to form protective layer 36 on a surface region forming the microvoids. The microvoided surface region or microstructure may be created by allowing a surface layer to react with water vapor at a sufficiently high temperature for a selected time duration to create a microvoided microstructure. Alternatively, the microvoided or porous microstructure may be created by plasma spraying. For example, a layer of microvoided $RE_2SiO_5$ can be created on intermediate layer 25 including $RE_2Si_2O_7$ by exposure to a flowing water vapor rich atmosphere for about 100 hours to about 500 hours at about 2400° F. The microvoids are then infiltrated with a chemically compatible, water vapor resistant oxide to create recession resistant surface layer 35. For example, the microvoided $RE_2SiO_5$ created on the $RE_2Si_2O_7$ intermediate layer 25 can be infiltrated with $RE_2O_3$ to produce a recession resistant surface layer 35 ($RE_2O_3+RE_2SiO_5$) that protects the underlying $RE_2Si_2O_7$ intermediate layer 25, silicon bondcoat 30 and CMC substrate material 25 from water vapor damage.

In a particular embodiment, intermediate layer 25 includes $Y_2Si_2O_7$ and protective layer 36 includes a microvoided $Y_2SiO_5$ layer infiltrated with $Y_2O_3$ to form recession resistant surface layer 35. Although the recession resistant oxide may not have a CTE that is well matched to the CTE of CMC substrate material 20 and/or the CTE of intermediate layer 25, recession resistant surface layer 35 is thin enough to prevent or resist cracking and water vapor penetration. Modeling indicates that a 0.001 inch thick $Y_2SiO_5$ recession resistant surface layer having a CTE of about 6.5×10$^{-6}$ l/C and elastic modulus E=30-40 GPa, applied to a CMC substrate material with a $Y_2Si_2O_7$ intermediate layer 25 having a CTE of about 4.5×10$^{-6}$ l/C and elastic modulus E=280 GPa, should fall below the cracking limit based on a strain-energy-release-rate criterion for through-thickness cracking.

In an alternative embodiment, recession resistant surface layer 35 includes a microvoided surface region infiltrated with a metal-oxide precursor of a recession resistant oxide. In one embodiment, a microvoided surface region, as described above, is infiltrated with a selected concentration of metal, which is then oxidized to form recession resistant surface layer 35. The infiltrant can be an aqueous or nonaqueous solution of a soluble RE salt, a suspension of submicron RE-containing particles or a solution that produces a metallic RE upon drying. Subsequent reaction or oxidation of the infiltrated RE fills the microvoids and produces recession resistant protective layer 35 having a general composition of $RE_2SiO_5$ on pore surfaces and/or the external surface.

In a particular embodiment, intermediate layer 25 includes $Y_2Si_2O_7$ and protective layer 36 includes a microvoided $Y_2SiO_5$ layer infiltrated with Y to form a dense, recession resistant surface layer 35 including $Y_2SiO_5$ and $Y_2O_3$. During this process, the volume increase upon oxidation facilitates filling of the micropores to create a dense surface microstructure. The dense, recession resistant surface layer 35 bonded to the thicker intermediate layer 25, e.g. $Y_2Si_2O_7$, produces a surface region that is highly resistant to water vapor penetration and is too thin to crack as a result of a CTE mismatch with substrate material 20. Additionally, the thicker intermediate layer 25 provides further protection to substrate material 20 should recession resistant surface layer 35 be breached, as well as a convenient substrate for surface tailoring.

Intermediate layer 25 having a general composition of $RE_2Si_2O_7$ initially may have inadequate recession resistance in a combustion atmosphere containing water vapor. In one embodiment, intermediate layer 25 is coated with a thin layer having a general composition of $RE_2O_3$. The layers react chemically upon exposure to elevated temperatures to form in-situ a thin, dense protective layer 36 having a general composition of $RE_2SiO_5$, which is chemically compatible with $RE_2Si_2O_7$. Protective layer 36 and, thus, recession resistant surface layer 35 have high recession resistance and a high cracking resistance. In a particular embodiment, a thin, uniform surface layer of a recession resistant oxide, such as $RE_2O_3$, is applied to intermediate layer 25 including $RE_2Si_2O_7$ using at least one of a physical vapor deposition, chemical vapor deposition, sol-gel coating, slurry coating, plasma spraying or paint spraying process. The $RE_2O_3$ layer reacts with the underlying $RE_2Si_2O_7$ layer to form a thin $RE_2SiO_5$ layer. Although the $RE_2SiO_5$ layer is not well CTE matched to the underlying $RE_2Si_2O_7$ layer, cracking is prevented or limited because the $RE_2SiO_5$ layer is thin, e.g., less than about 0.001 inch (25 micrometers), and the volume change of the reaction $RE_2O_3+RE_2Si_2O_7=2RE_2SiO_5$ is only about 1%. Further, the $RE_2O_3/RE_2Si_2O_7$ reaction can be beneficial in eliminating or reducing surface cracks and pores and producing a microstructurally favorable surface layer.

In one embodiment, the initial $RE_2Si_2O_7$ layer is infiltrated by a precursor solution including at least one RE, such as an aqueous solution including an inorganic RE salt, a non-aqueous solution including a RE-alcoxide or a carrier for metallic RE, prior to or in lieu of deposition of the $RE_2O_3$ layer. Penetration of the RE-including precursor into open pores in the $RE_2Si_2O_7$ layer results in formation of $RE_2SiO_5$ on pore walls when exposed to an elevated temperature. Such in-situ formed $RE_2SiO_5$ provides further protection of the porous $RE_2Si_2O_7$ substrate from exposure to water vapor.

In one embodiment, the present invention provides a method for fabricating a component, such as gas turbine engine component 15, having environmental barrier coating 10. Gas turbine engine component 15 includes silicon and has a first coefficient of thermal expansion. Intermediate layer 25 is bonded to an outer surface of gas turbine engine component 15. Intermediate layer 25 has a second coefficient of thermal expansion within about +/−15% of the coefficient of thermal expansion of gas turbine engine component 15. In a particular embodiment, a second intermediate layer is bonded to the first intermediate layer. In this embodiment, the second intermediate layer has a coefficient of thermal expansion similar or identical to the coefficient of thermal expansion of the first intermediate layer. Alternatively, the second intermediate layer has a coefficient of thermal expansion different than the coefficient of thermal expansion of the first intermediate layer. It is apparent to those skilled in the art and guided by the teachings herein provided that environmental barrier coating 10 can include any suitable number of intermediate layers.

Protective layer 36, having a general composition of $RE_2SiO_5$, is bonded to the outer intermediate layer. In one embodiment, protective layer 36 is deposited on intermediate layer 25. In a particular embodiment, protective layer 36 is bonded to intermediate layer 25 by a reaction of a metal-oxide precursor material with intermediate layer 25. For example, protective layer 36 including $RE_2SiO_5$ is formed by reacting a metal-oxide precursor material including $RE_2O_3$ with intermediate layer 25 including $RE_2Si_2O_7$. In one embodiment, surface layer 38 is bonded to protective layer 36. Surface layer 38 includes at least one RE and has a ratio of RE to oxygen of at least 2:3.

Alternatively, protective layer 36 is formed and bonded to intermediate layer 25 by heat treating environmental barrier coating 10 after surface layer 38 is deposited on intermediate layer 25. In another alternative embodiment, protective layer 36 is bonded to intermediate layer 25 by forming protective layer 36 in-situ during service of the environmental barrier coated CMC component.

The above-described environmental barrier coating for a silicon-based component, e.g., a SiC/SiC CMC or silicon nitride material component, is crack resistant due to the CTE compatibility between the substrate material and the intermediate layer, and the dense, highly recession resistant surface layer that is too thin to exhibit deleterious cracking. The recession resistant surface layer prevents or limits exposure of the underlying layers to the combustion atmosphere. The environmental barrier coating has adequate durability and recession resistance to meet the design lifetime goal of up to about 32,000 service hours at a temperature of about 2400° F. Further, the intermediate layer provides further protection to the underlying substrate material should the recession resistant surface layer be breached, as well as a convenient substrate for surface tailoring.

Exemplary embodiments of an environmental barrier coating and a method for fabricating components including the environmental barrier coating are described above in detail. The environmental barrier coating and method are not limited to the specific embodiments described herein, but rather, components of the environmental barrier coating and/or steps of the method may be utilized independently and separately from other components and/or steps described herein. Further, the described components and/or method steps can also be defined in, or used in combination with, other coatings and/or methods, and are not limited to practice with only the environmental barrier coating and method as described herein.

While the invention has been described in terms of various specific embodiments, those skilled in the art will recognize that the invention can be practiced with modification within the spirit and scope of the claims.

What is claimed is:

1. A method for fabricating a component having an environmental barrier coating, said method comprising:
   providing the component comprising silicon having a first coefficient of thermal expansion;
   bonding to a bondcoat to at least a portion of an outer surface of the component;
   bonding an intermediate layer having a second coefficient of thermal expansion matched to the first coefficient of thermal expansion to the bondcoat, said intermediate layer having a general composition of $RE_2Si_2O_7$;
   bonding a protective layer having a general composition of $RE_2SiO_5$ to the intermediate layer; and
   bonding a surface layer comprising RE and having a ratio of RE to oxygen of at least 2:3 to the protective layer.

2. A method in accordance with claim 1, wherein bonding a protective layer to the intermediate layer further comprises reacting the surface layer with the intermediate layer to form the protective layer.

3. A method in accordance with claim 1, wherein bonding a protective layer to the intermediate layer further comprises:
   forming a plurality of microvoids on a surface region of the intermediate layer; and
   infiltrating the plurality of microvoids with the surface layer to form the protective layer within the plurality of microvoids.

4. A method in accordance with claim 1, wherein bonding a protective layer to the intermediate layer further comprises forming the protective layer by heat treating the environmental barrier coating.

5. A method in accordance with claim 1, wherein bonding a protective layer to the intermediate layer further comprises forming the protective layer in-situ during service of the gas turbine engine component.

* * * * *